Aug. 15, 1933.  H. J. J. M. DE R. DE BELLESCIZE  1,922,282
SIGNAL RECEIVING SYSTEM
Filed Feb. 24, 1932  4 Sheets-Sheet 1
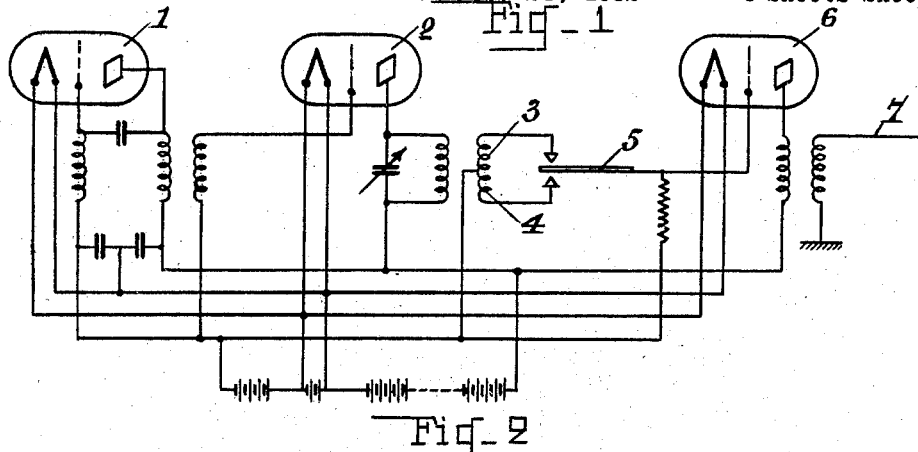
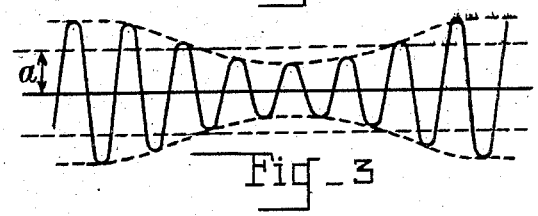
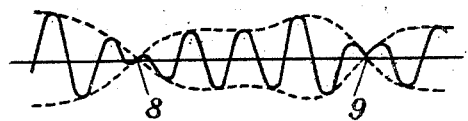
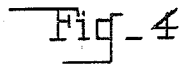
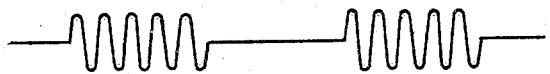
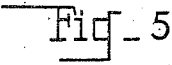
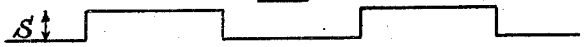
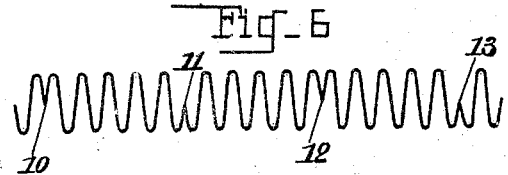
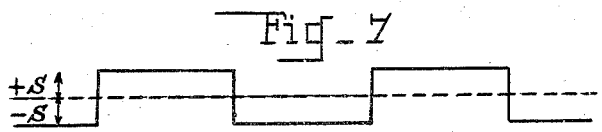
Inventor
H.J.J.M. de R. de Bellescize,
by John B. Grady
Attorney

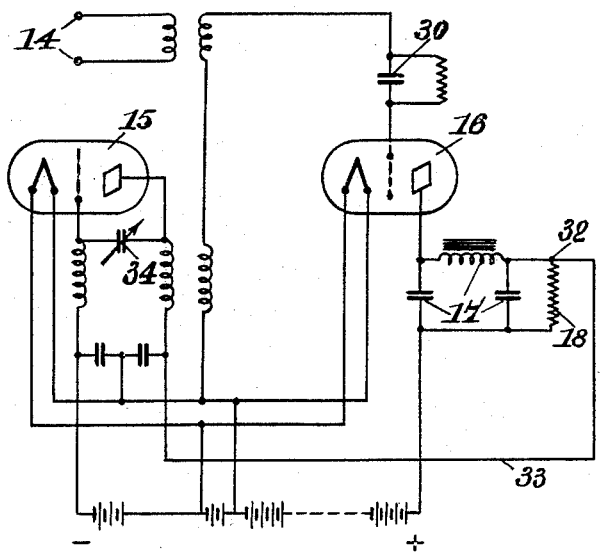
Fig_8
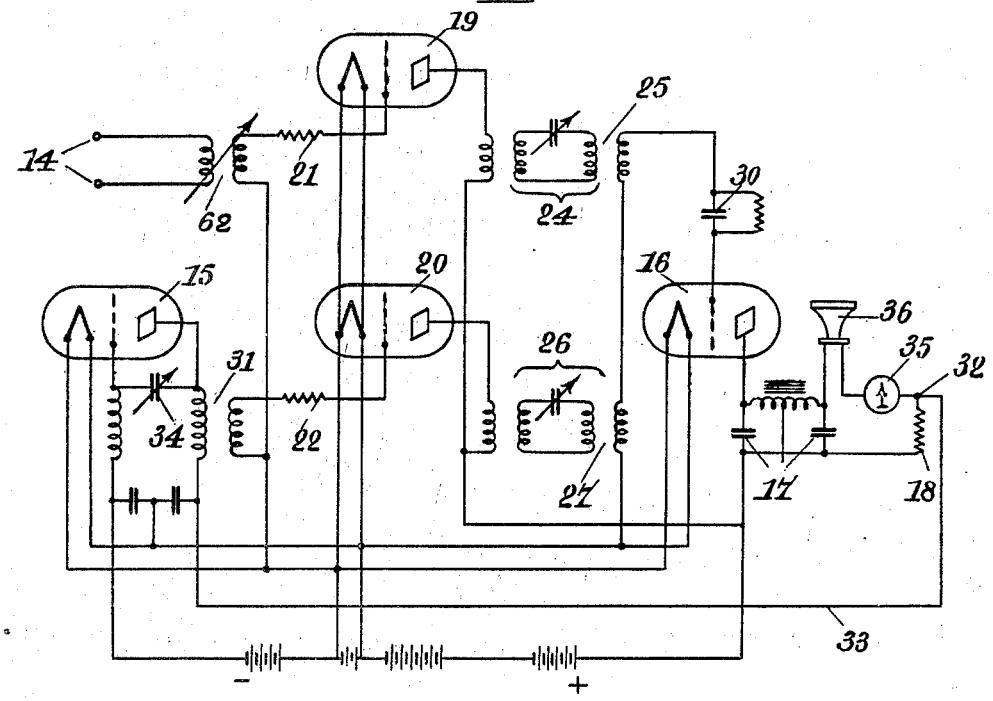
Fig_9

Aug. 15, 1933.    H. J. J. M. DE R. DE BELLESCIZE    1,922,282
SIGNAL RECEIVING SYSTEM
Filed Feb. 24, 1932    4 Sheets-Sheet 3
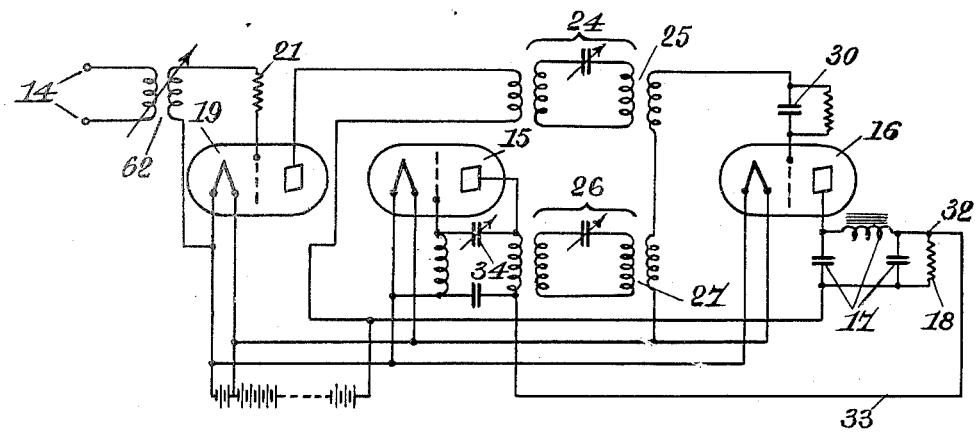
Fig_10
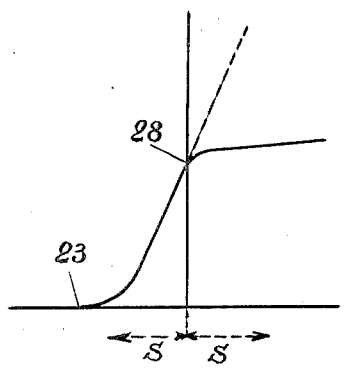
Fig_11

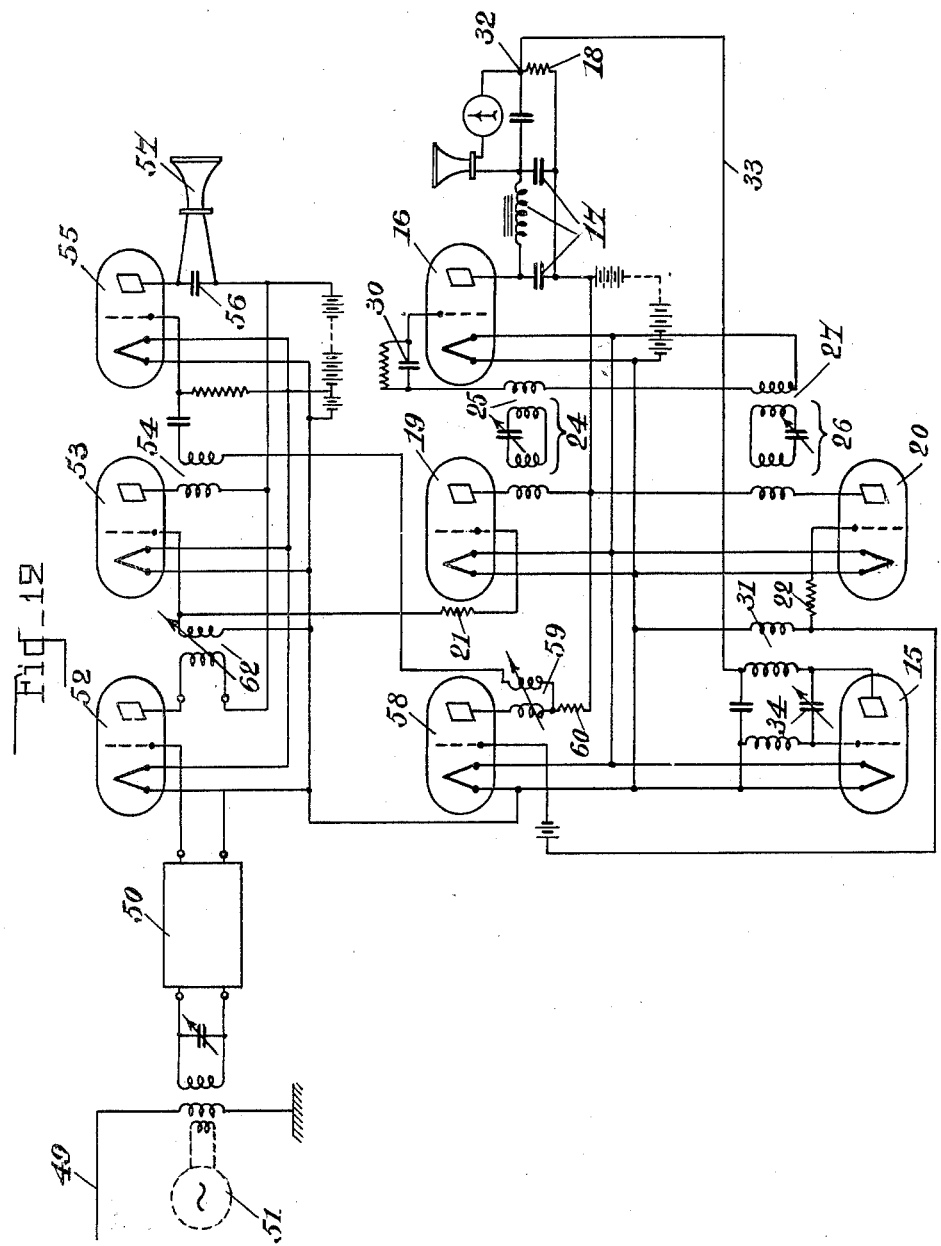

Patented Aug. 15, 1933

1,922,282

UNITED STATES PATENT OFFICE 1,922,282

SIGNAL RECEIVING SYSTEM

Henri Jean Joseph Marie de Regnauld de Bellescize, Neuilly-sur-Seine, France

Application February 24, 1932, Serial No. 594,885, and in France April 29, 1931

5 Claims. (Cl. 250—8)

My invention relates broadly to the reception of transmitted signals without a carrier wave or carrier current, and more specifically to a signaling system in which signals are transmitted by means of a periodic current whose phase may alternately shift in opposition.

One of the objects of my invention is to provide a communication system operating without a carrier wave or carrier current.

Another object of my invention is to provide a system of signaling circuits adapted for operation either by line wire or by spaced radio for the selective transmission of signals without a carrier wave.

Still another object of my invention is to provide a selective transmission and receiving system for electrical signals in which the signaling energy is constituted by a periodic current whose phase alternately shifts in opposition.

A further object of my invention is to provide an arrangement of signal receiving circuit in which means are provided at the receiver for impressing energy upon a detector in alternate opposed phase under control of incoming signaling current for the selective operation of a signal indicator.

A still further object of my invention is to provide a selective circuit for the reception of signaling energy in which separate means are provided for increasing the frequency of the incoming signaling energy and the frequency of a local oscillator and deriving auxiliary currents which are mutually modulated for actuating a synchronizing system.

Another object of my invention is to provide a signal receiving circuit including a local oscillator, a detector and a signal indicator actuated by the detector with means for combining in the said detector the signal oscillation with an oscillation of the local generator, and impressing the current derived from the combination of these oscillations in successively opposite phase relations upon the detector for selectively operating said indicator.

Other and further objects of my invention will be understood from the specification hereinafter following by reference to the accompanying drawings in which:

Figure 1 diagrammatically shows the fundamental circuits of a transmitter arranged according to my invention and adapted to send out a periodic current whose amplitude is in turn positive or negative, or in other words, whose phase assumes in turn two values which are in opposition; Fig. 2 shows a curve representing the oscillations of ordinary telephony employing a carrier wave; Fig. 3 is a curve showing the oscillations in telephony without carrier wave; Fig. 4 is a curve showing the oscillations of an ordinary telegraph signal; Fig. 5 indicates the detected current furnished by the telegraph signal to the recording relay; Fig. 6 is a curve showing the oscillations of a telegraph signal in which the dots or dashes, on the one hand, and the spaces between the dots and dashes of the alphabet, on the other hand, consist of two sinusoidal currents of the same frequency, whose phases are in opposition; Fig. 7 shows the detected current which is furnished by the telegraph signal to the recording relay, when the reception takes place in accordance with my invention; Fig. 8 shows a schematic circuit arrangement for a receiving station employing a local current synchronized with the incoming signal whose amplitude is always positive, that is, whose phase is constant to which circuit the system of my invention may be applied; Fig. 9 illustrates a receiving circuit arrangement responsive to signals whose phase assumes two values in opposition in accordance with my invention; Fig. 10 shows a modified form of the receiving circuit of my invention in which a harmonic of the local generator is utilized for coaction with the incoming signaling energy; Fig. 11 shows a curve explanatory of the receiving circuits shown in Figs. 8 and 9; and Fig. 12 shows a complete receiving system constructed in accordance with my invention.

It is a known fact that in the receiving systems in present use, it is required that the amplitude of the oscillation forming the signal shall always have the same sign. For instance, a telephonic transmission is represented by the algebraic expression $$[a+f(t)] \sin(\omega t+\phi)$$

and the greatest care is taken that the constant amplitude $a$ of the carrier wave shall be at all times greater than the amplitude $f(t)$ of the modulation, which is in turn positive and negative.

In consequence, the total amplitude $$s = a + f(t)$$

is always positive. On the other hand, its mean value during a prolonged space of time is not null, and it is in fact equal to $a$.

In like manner, in ordinary telegraphy by full current or no current, the amplitude $a$ of the oscillation maintains a constant value of $+S$ during the dots and dashes, and a zero value in the spaces between the dots or dashes; at no time will this amplitude change its sign, and its mean value during a prolonged space of time, or about $$+\frac{S}{2}$$

is not null.

Instead of these signals generally used, it is preferable to employ others in which the amplitude is positive or negative in turn and will have a mean value which is practically null.

This will be for example the case with the transmission and reception of telephony without carrier wave, as shown by the expression.

$$f(t).\sin(\omega t+\phi)$$

in which the amplitude $s=f(t)$, which is in turn positive or negative, has a mean value which is null, or $$\frac{1}{T}\int_0^T f(t).dt = 0$$

This will also be the case (which has never as yet been considered) for a telegraphic transmission in which the dots and dashes of the alphabet are formed by an oscillation $$+S\sin(\omega t+\phi)$$

and the spaces between dots and dashes, by an oscillation $$-S\sin(\omega t+\phi)=+S\sin(\omega t+\phi+\pi)$$

In this case as well, since the amplitude $s$ has the values $+S$ and $-S$ in turn, its mean value $$\frac{1}{T}\int_0^T s.dt$$

during a prolonged space of time would be null or very small.

Such signals could not be received by an ordinary receiver, and would not be intelligible in a telephone as they would be reproduced as a continuous tone. However, theoretically, the signals could be recorded if the receiving station contained a local generator providing a current $$H\sin(\omega t+\phi) \quad (H>0)$$

by which the signal would be modulated. Since the modulation of a current $s.\sin(\omega t+\phi)$ by another current $H\sin(\omega_0 t+\phi_0)$ furnishes, among others, a resulting current proportional to $$s.\cos[(\omega_0-\omega)t+\phi_0-\phi]$$

the use of a local current complying with the condition $$\omega_0=\omega \quad \phi_0=\phi$$

would finally produce a current $s=f(t)$ in the recording apparatus which reproduces the modulation.

For the reasons above stated, this result could not be heretofore obtained by existing systems or methods and my invention accomplishes results not heretofore obtainable.

Referring to the drawings in detail, the transmitter may consist of a telephony station which is so arranged as to eliminate the carrier wave or current. A telegraphy station as shown in Fig. 1 may also be employed. The transmitter consists of an oscillator 1 and amplifiers 2 and 6 connected therewith. A coupling transformer disposed between the output of amplifier tube 2 and the input of tube 6, which transformer includes a secondary winding including half sections 3 and 4. The two halves of the transformer winding 3—4 produce electromotive forces which are the reverse of one another, are put in use alternately by keys 5 operative between contacts connected with opposite ends of winding 3—4, and supply to the antenna or to the transmission line 7 through amplifier 6 the currents or oscillations of the master oscillator 1. According to the position of the keys 5, the antenna or the line 7 will transmit, as desired, a current $$+S.\sin(\omega t+\phi) \text{ or a current } -S.\sin(\omega t+\phi)$$

In the receiver, the phenomena involved may be stated as follows. The statement that the amplitude $s$ of an oscillation is in turn positive or negative, is a simple mathematical expression connected with the conventional definition which is given to the amplitude, but in reality, this expression signifies that the phase of the received oscillation is in turn equal to $\phi$ or to $\phi+\pi$. This actual condition is shown by the figures. In Figs. 2 and 4, relating to ordinary transmission, the former with a modulated carrier wave, and the latter by full current or no current, the phase of the oscillation remains constant. On the contrary, in Figs. 3 and 6 whereof one relates to telephonic transmission without carrier wave, and the other to telegraphic transmission employing in turn two oscillations whose amplitudes are $+S$ and $-S$, the phase is reversed at the moments 8, 9 ... 10, 11, 12 and 13.

For this reason, it is no longer possible, properly speaking, to synchronize a local generator with these signals, as the object of this generator is to supply a current $H.\sin(\omega t+\phi)$ whose pulsation $\omega$ and phase $\phi$ are constant, while the phase of the signal is variable.

In particular, the method described in my co-pending application Serial No. 574,858 filed November 13, 1931, and entitled "Synchronization system" is no longer applicable. The said arrangement, which serves for ordinary signals as shown in Figs. 2 and 4, consists essentially as can be understood more clearly from Fig. 8 in modulating the received signal $s.\sin(\omega t+\phi)$ collected at 14 by the current $H.\sin(\omega_0 t+\phi_0)$ of a local generator 15; the modulation being effected in a detecting valve 16, and after a filtering operation at 17, it furnishes a low-frequency current.

$$s.\cos[(\omega_0-\omega)+\phi_0-\phi]$$

and this, when in synchronism with the generator ($\omega_0=\omega$) becomes continuous and equal to $s.\cos(\phi_0-\phi)$. The variations of potential set up by this current in the resistance supplied from the filter circuit act, for instance, by modifying the grid or the plate potential of the generator upon the proper frequency of the said generator, and thus the said frequency is suitably controlled.

However, in the case of the new signals in question, which are characterized by:

$$\frac{1}{T}\int_0^T s.dt = 0$$

the mean value of the synchronizing current $s.\cos(\phi_0-\phi)$ would be evidently null, and the control would not be possible. For the reception of signals without carrier waves, the receiving circuit shown in Fig. 8 must be rearranged.

The feature which characterizes my present invention consists in controlling the frequency of the local generator, no longer by using for this purpose the variable-phase periodic current constituting the signal, but by transforming this current by suitable means and producing, from this transformation, an auxiliary current having a constant phase. Numerous means are already known for obtaining, from a periodic current, whose phase is alternately $\phi$ and $\phi+\pi$, another current whereof one or more harmonics have a constant phase.

The signal may, for instance, be sent into a detector having the effect of the square; this signal supplies to the detector an oscillation represented in turn by $S \sin(\omega t+\phi)$ or by $S \sin(\omega t+\phi+\pi)$, and it is transformed therein into a constant current represented by $$[\pm S \sin(\omega t+\phi)]^2 = 0.5 S^2 [1-\cos 2(\omega t+\phi)]$$

The phase $2\phi$ of the auxiliary current $\cos 2(\omega t+\phi)$ remains the same, whether the phase of the signal be $\phi$ or $\phi+\pi$.

Instead of a detector having the effect of the square, it is possible to employ a rectifying contact device, or a valve which operates on either side of a sharp bend in its curve. In fact, in the Fournier series equivalent to the current obtained by rectifying either one alternation out of two, or all of the consecutive alternations of a sinusoidal current, all of the even-numbered harmonics have a phase which is independent of the phase reversals to which this sinusoidal current may be subjected. For instance, the valves 19—20 (Figs. 9 and 12) will be used on either side of the sharp bend 28 (Fig. 11) which is formed in their plate circuit characteristic curves by inserting resistances 21—22 into their grid circuits.

It is also feasible to send the signal oscillation into a frequency-doubling device consisting of a transformer in which the iron is operated near the saturation point.

When once in possession, by suitable means, of a current resulting from the signal, but whose phase is constant and is independent of the phase-reversals of this signal, it is now possible to control the frequency of the local generator. I may for example make use of the arrangement shown in Fig. 8, modifying it as follows: the low-frequency current or potential which becomes continuous at synchronism and serves to control the frequency of the local generator, is obtained by the mutual modulation, not of the signal received in the receiver and the oscillation of the local generator, but of two auxiliary oscillations which are currents of double frequency, obtained by sending each of these oscillations through a rectifier.

Fig. 9 shows a circuit arrangement for the reception of signals without carrier waves, and shows the manner in which the circuit of Fig. 8 which is adapted for ordinary signals can be modified.

Conductor 14 transmits oscillation $S \sin(\omega t+\phi)$ or $S \sin(\omega t+\phi+\pi)$ the phase of which is inversed in accordance with the signal transmitted. The generator 15, 34 furnishes further the locally generated oscillation $H \sin(\omega_0 t+\phi_0)$. It would be desirable to have the algebraic difference $(\omega t+\phi)-(\omega_0 t+\phi_0)$ constant, in other words that the phase $(\omega_0 t+\phi_0)$ of the locally generated oscillation remain invariable in relation to one of the phases $(\omega t+\phi)$ for instance, of the signal oscillation.

This result evidently, cannot be obtained directly, but the object of the invention is, precisely, to surmount the difficulty by doubling the frequencies. The frequency of the signal oscillation $\pm S \sin(\omega t+\phi)$ is doubled in 19, which produces in 25 a certain auxiliary oscillation $S_1 \sin(2\omega t+2\phi)$, whose phase is at present constant, and the amplitude positive. In the same way, the frequency of the locally generated oscillation $H \sin(\omega_0 t+\phi_0)$ is doubled in 20, which produces in 27 a second auxiliary oscillation $H_1 \sin(2\omega_0 t+2\phi_0)$.

The two auxiliary oscillations, whose phases are both independent of the inversions of the signal oscillations, are thus ordinary oscillations that may be synchronized one with the other by simply applying the process already described in my copending application Serial No. 574,858, filed November 13, 1931. These oscillations interfere in the detector 16 and the resulting detected current controls, by means of tap 32, conductor 33 and local generator 15, 34, the frequency $$\frac{2\omega_0}{2\pi}$$

of the auxiliary oscillation furnished to the detector by transformer 27. It is not at all necessary that the frequency of the controlled generator 15, 34 be equal to the frequency of the synchronized oscillations. The frequency of one of the two synchronized oscillations should depend on the local generator whose frequency is controlled; the mode of dependence remains arbitrary, and it is permissible to transform in any way, the frequency of the locally generated oscillation between generator 15, 34 and transformer 27.

The device of Fig. 9 realizes thus a synchronism between the two auxiliary oscillations, and the said synchronism is all the more stable when the two oscillations interfering in the detector 16 are maintained in quadrature which produces, when K is an integer $$2\omega t + 2\phi = 2\omega_0 t + 2\phi_0 + \frac{\pi}{2} + 2k\pi$$

and $$\omega t + \phi = \omega_0 t + \phi_0 + \frac{\pi}{4} + k\pi$$

The phase $\omega_0 t+\phi_0$ of the local generator 15, 34 is thus fixed. It differs indifferently at 45° or 225° with the phase of the signal oscillation—this explains the reason why the latter can be inversed while the phase of the generator remains constant.

The oscillation of the signal $S \sin(\omega t+\phi)$ or $S \sin(\omega t+\phi+\pi)$ which is collected at 14, actuates the grid of a valve 19, through the medium of the resistance in series 21 adapted to bend the curve of the plate circuit characteristic. By reason of this bend, there is produced in the plate circuit a current of double frequency and of constant phase. This current energizes the filter 24 which is tuned to the new pulsation $2\omega$, and said filter energizes in turn, by means of the transformer 25, the grid of the detecting valve 16. The detection may take place by means of a shunted condenser 30 or the like constituting a grid leak. The oscillation $H \sin(\omega_0 t+\phi_0)$ of the local generator 15, which is collected at 31, actuates the valve 20 in which is produced an auxiliary current having a pulsation $2\omega_0$. This current is filtered at 26 and it also energizes the detecting valve 16 by means of the transformer 27. These two auxiliary currents, whose frequencies are respectively double the frequencies of the signal and of the local generator, are mutually modulated in the valve 16 whose plate circuit becomes, among others, the seat of a current of very low frequency, proportional to $$\cos 2[(\omega_0-\omega)t+\phi_0-\phi]$$

After passing through the low pass-band filter 17, this current will alone pass through the resistance 18, and it produces at the end 32 of this resistance variations of potential which are also represented by the preceding expression. These variations control, within very narrow limits, the proper frequency of the local generator 15; it is possible for instance to supply the plate circuit of this generator from the tap connection 32, as it is a known fact that by changing the plate circuit tension of a self-excited generator, its frequency is somewhat changed.

The synchronizing device shown in Fig. 9 is adjusted as follows: The action of the signal is reduced by loosening (for instance) the coupling of the transformer 62 until the beats of the pulsation $2(\omega_0-\omega)$ due to the interference between the two auxiliary currents having respectively the pulsations $2\omega_0$ and $2\omega$ are faintly heard in the telephone 36, and thus the amplitude of such beats will be too small to appreciably change the potential derived from the tap connection 32, and this latter assumes a constant value. The tuning condenser 34 is then carefully adjusted in order to bring the pulsation $\omega_0$ of the local generator as nearly equal as possible to the pulsation $\omega$ of the signal. This is observed by the fact that the beats heard in the telephone 36 becomes lower in pitch and are then inaudible. The coupling 62 is then made closer, so that the signal will assume its normal intensity. The two auxiliary currents which interfere in the valve 16 will then act upon the proper frequency of the generator 15 derived from the tap connection 32 and the connection 33, and will thus be automatically synchronized. This is observed to take place when the pointer of the milliampere-meter 35 remains stationary.

If, as frequently happens, the local generator 15 will itself produce harmonics which are superposed upon its fundamental oscillation $H \sin(\omega_0 t+\phi_0)$, the valve 20 which serves to produce the auxiliary current of pulsation $2\omega_0$ now becomes superfluous; the simplified arrangement shown in Fig. 10 can hence be employed, and herein the local generator 15 is directly coupled to the filter 26 adapted to isolate its second harmonic. The remainder of the arrangement is the same as the one already described; the two auxiliary currents which interfere in the valve 16 in which they become synchronized, will form respectively the second harmonic of the local generator, and the current whose pulsation is $2\omega$ obtained from the signal by sending the latter through a valve having a sharp bend in its characteristic curve at 28, and through the filter 24.

The arrangement for synchronizing the two auxiliary currents is set forth more fully in my copending application hereinbefore referred to. The synchronism is more stable when the two oscillations which are mutually modulated in the valve 16 are in quadrature therein; the obtainment of this result can be observed by the fact that the current in the milliampere-meter 35 is not changed by the controlling oscillation received at 14.

Fig. 12 shows a receiver embodying my invention, and herein the signals are received by the antenna or by the line 49; they are selected and amplified at 50, and may be modulated by a heterodyne 51 adapted to reduce their frequency. When issuing from this circuit, the waves energize a valve 52 whose plate circuit supplies through a transformer 62 two circuits. The circuit at the upper part of the diagram in Fig. 12 comprises a valve 53 whose plate circuit acts, through a transformer 54, upon the grid of a detecting valve 55 having the recording apparatus 57 connected with the output thereof. The apparatus 57 may consist of a telephone or a relay. The other circuit at the lower part of the figure represents the aforesaid synchronizing arrangement shown in Fig. 9.

The oscillation of the signal can also be modulated at the transmitting station, and can be given the known form $$s[i+\sin(\Omega t+\Phi)]\sin(\omega t+\phi)$$

At the receiving station, the oscillations having the pulsation can be selected and detected in order to obtain a detected current which is proportional to $$s. \sin(\Omega t+\Phi)$$

The receiving methods hereinbefore set forth can then be employed for the pulsation $\Omega$.

In Fig. 12, the phase displacing device 59, 60 allows the difference of 45° or 225° heretofore referred to, to be cancelled and finally, the oscillations acting on detector 55 which feeds the register 57 are $\pm S \sin(\omega+\phi)$ for the signal; $H \sin(\omega+\phi)$ for the locally generated oscillation.

I have found the communication system of my invention highly practical for transmission and reception without the carrier wave. My invention is applicable to both line wire communication and spaced radio systems. While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. A receiving system adapted to receive a signal consisting of an oscillation whose frequency is constant and whose phase assumes alternately two values in opposition, comprising, a local generator supplying a continuous oscillation having the same frequency as the signal oscillation, means for obtaining from the said signal oscillation a first auxiliary oscillation whose phase is constant and whose frequency is a multiple of that of the signal oscillation, means for obtaining from the continuous oscillation supplied by the local generator a second auxiliary oscillation having the same frequency as the first-mentioned auxiliary oscillation, means for effecting the interference of the two auxiliary oscillations for producing a resulting interference current, means for controlling the frequency of the said local generator by the said interference current, and means for simultaneously impressing the signal oscillation and the continuous oscillation supplied by the local generator on the detector of the receiving system.

2. A receiving system adapted to receive a signal consisting of an oscillation whose frequency is constant and whose phase assumes alternately two values in opposition, comprising, a local generator supplying a continuous oscillation of the same frequency as the signal oscillation, a first rectifier, whose input circuit is affected by the signal oscillation and whose output circuit supplies first auxiliary oscillation whose frequency is double that of the signal oscillation, a second rectifier, whose input circuit is affected by the continuous oscillation of the local generator and whose output circuit supplies a second auxiliary oscillation whose frequency is double that of the said continuous oscillation, a third rectifier, which is simultaneously affected by the said auxiliary oscillations and in which the two auxiliary oscillations coact to produce an interfering current, a circuit energized by the said interference current for controlling the frequency of the local generator, and means for simultaneously impressing the signal oscillation and the continuous oscillation supplied by the local generator on the detector of the receiving system.

3. A receiving system adapted to receive a signal consisting of an oscillation whose frequency is constant and whose phase assumes in turn two values in opposition, comprising a generator supplying a local oscillation having the same frequency as the signal, a first auxiliary circuit whose input end receives the signal oscillation and whose end supplies an auxiliary oscillation whose frequency is a multiple of the signal frequency, a second auxiliary circuit adapted to select the harmonic of the local oscillation having the same frequency as the auxiliary oscillation, a rectifier in which the auxiliary oscillation obtained from the signal and the harmonic obtained from the local oscillation are caused to interfere, a connection by which the current produced by this interference controls the frequency of the generator, and means for simultaneously impressing the signal and the local oscillation supplied by the generator on the detector of the receiving system.

4. A receiivng system adapted to receive a signal without carrier oscillation, comprising: a local generator supplying a continuous oscillation having the same frequency as the signal, means for obtaining from the oscillation constituting the signal a first auxiliary oscillation whose phase is constant and whose frequency is a multiple of that of the signal, means for obtaining from the continuous oscillation supplied by the local generator a second auxiliary oscillation having the same frequency as the first-mentioned auxiliary oscillation, means causing the interference of the two auxiliary oscillations, means for controlling the frequency of the said local generator by the current produced by the said interference, and means for simultaneously impressing the signal and the continuous oscillation supplied by the local generator on the detector of the receiving system.

5. A receiving system adapted to receive a telegraphic signal in which the dots and dashes on the one hand, and the spaces between the dots and dashes on the other hand, consist respectively of two oscillations having the same frequency and in phase opposition, comprising: a local generator supplying a continuous oscillation having the same frequency as the signal, means for obtaining from the oscillation constituting the said signal a first auxiliary oscillation whose phase is constant and whose frequency is a multiple of that of the signal, means for obtaining from the continuous oscillation supplied by the local generator a second auxiliary oscillation having the same frequency as the first-mentioned auxiliary oscillation, means causing the interference of the two auxiliary oscillations, means for controlling the frequency of the said local generator by the current produced by the said interference, and means for simultaneously impressing the signal and the continuous oscillation supplied by the local generator on the detector of the receiving system.

HENRI JEAN JOSEPH MARIE
DE REGNAULD DE BELLESCIZE.

DISCLAIMER 1,922,282.—*Henri Jean Joseph Marie de Regnauld de Bellescize*, Neuilly-sur-Seine, France. SIGNAL RECEIVING SYSTEM. Patent dated August 15, 1933. Disclaimer filed June 9, 1937, by the patentee.

Hereby enters this disclaimer to claims 1 and 3 of said Letters Patent.

[*Official Gazette July 6, 1937.*]

DISCLAIMER 1,922,282.—*Henri Jean Joseph Marie de Regnauld de Bellescize*, Neuilly-sur-Seine, France. SIGNAL RECEIVING SYSTEM. Patent dated August 15, 1933. Disclaimer filed June 9, 1937, by the patentee.

Hereby enters this disclaimer to claims 1 and 3 of said Letters Patent as follows:

1. To any "local generator supplying a continuous oscillation having the same frequency as the signal oscillation", as set forth in claim 1, except as the said same frequency is obtained through adjustable tuning means acting upon the frequency relation of the two oscillations, whereby the phase relation of the synchronized waves may be brought to quadrature.

3. To any "generator supplying a local oscillation having the same frequency as the signal" oscillation, as set forth in claim 3, except as the said same frequency is obtained through adjustable tuning means acting upon the frequency relation of the said oscillations; to any "connection by which the current produced by this interference controls the frequency of the generator", except as the said connection is a purely electrical one whereby the said frequency control is speedy enough to follow the accidental frequency and phase fluctuations of the signal oscillation.

This disclaimer correcting error as to claims 1 and 3 supersedes disclaimer published in O. G. July 6, 1937.

DISCLAIMER 1,922,282.—*Henri Jean Joseph Marie de Regnauld de Bellescize*, Neuilly-sur-Seine, France. SIGNAL RECEIVING SYSTEM. Patent dated August 15, 1933. Disclaimer filed June 9, 1937, by the patentee.

Hereby enters this disclaimer to claims 1 and 3 of said Letters Patent as follows:

1. To any "local generator supplying a continuous oscillation having the same frequency as the signal oscillation", as set forth in claim 1, except as the said same frequency is obtained through adjustable tuning means acting upon the frequency relation of the two oscillations, whereby the phase relation of the synchronized waves may be brought to quadrature.

3. To any "generator supplying a local oscillation having the same frequency as the signal" oscillation, as set forth in claim 3, except as the said same frequency is obtained through adjustable tuning means acting upon the frequency relation of the said oscillations; to any "connection by which the current produced by this interference controls the frequency of the generator", except as the said connection is a purely electrical one whereby the said frequency control is speedy enough to follow the accidental frequency and phase fluctuations of the signal oscillation.

This disclaimer correcting error as to claims 1 and 3 supersedes disclaimer published in O. G. July 6, 1937.